(12) United States Patent
Baalmann et al.

(10) Patent No.: US 9,593,697 B2
(45) Date of Patent: Mar. 14, 2017

(54) VIBRATION DAMPER WITH A HYDRAULIC END STOP

(71) Applicants: Helmut Baalmann, Bergrheinfeld (DE); Stefan Schmitt, Gochsheim (DE); Peter Schmitt, Bad Kissingen (DE)

(72) Inventors: Helmut Baalmann, Bergrheinfeld (DE); Stefan Schmitt, Gochsheim (DE); Peter Schmitt, Bad Kissingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 415 days.

(21) Appl. No.: 14/366,953

(22) PCT Filed: Nov. 21, 2012

(86) PCT No.: PCT/EP2012/073209
§ 371 (c)(1),
(2) Date: Jun. 19, 2014

(87) PCT Pub. No.: WO2013/092084
PCT Pub. Date: Jun. 27, 2013

(65) Prior Publication Data
US 2014/0360353 A1    Dec. 11, 2014

(30) Foreign Application Priority Data
Dec. 20, 2011   (DE) .................. 10 2011 089 140

(51) Int. Cl.
*F15B 15/24*   (2006.01)
*F16F 9/49*   (2006.01)
(Continued)

(52) U.S. Cl.
CPC ............... *F15B 15/24* (2013.01); *F16F 9/49* (2013.01); *F15B 15/222* (2013.01); *F16J 15/16* (2013.01)

(58) Field of Classification Search
CPC ....... F16J 15/16; F16J 15/3204; F15B 15/222; F15B 15/223; F15B 15/24
(Continued)

(56) References Cited

U.S. PATENT DOCUMENTS 4,345,748 A * 8/1982 Wossner ............. B60G 15/061
188/322.17
6,634,471 B2   10/2003 Obst
2002/0104723 A1 * 8/2002 Obst ...................... F16F 9/49
188/288

FOREIGN PATENT DOCUMENTS

DE   8130523 U1   2/1982
DE   4212228 C2   3/1994
GB   1192846      5/1970

* cited by examiner

*Primary Examiner* — John K Fristoe, Jr.
*Assistant Examiner* — Daniel Collins
(74) *Attorney, Agent, or Firm* — Cozen O'Connor

(57) ABSTRACT

The vibration damper including a hydraulic end stop that has a sealing ring which is arranged between the end stop ring and the closure element, is supported axially on one side at the end stop ring, engages radially around the piston rod, is mounted in a sliding manner at the piston rod, and with its outer circumferential surface radially contacts the inner wall of the control space, wherein the sealing ring has at least one radial throttle groove which takes effect when the end stop with the sealing ring moves into the control space and ensures a defined flow of damping medium between the control chamber and the first working space, and wherein the sealing ring has a plurality of spring tongues which are supported at a supporting surface on the piston rod side.

16 Claims, 4 Drawing Sheets

(51) Int. Cl.
*F16J 15/16* (2006.01)
*F15B 15/22* (2006.01)

(58) Field of Classification Search
USPC .......... 91/394, 396; 92/165 R; 277/558, 566
See application file for complete search history.

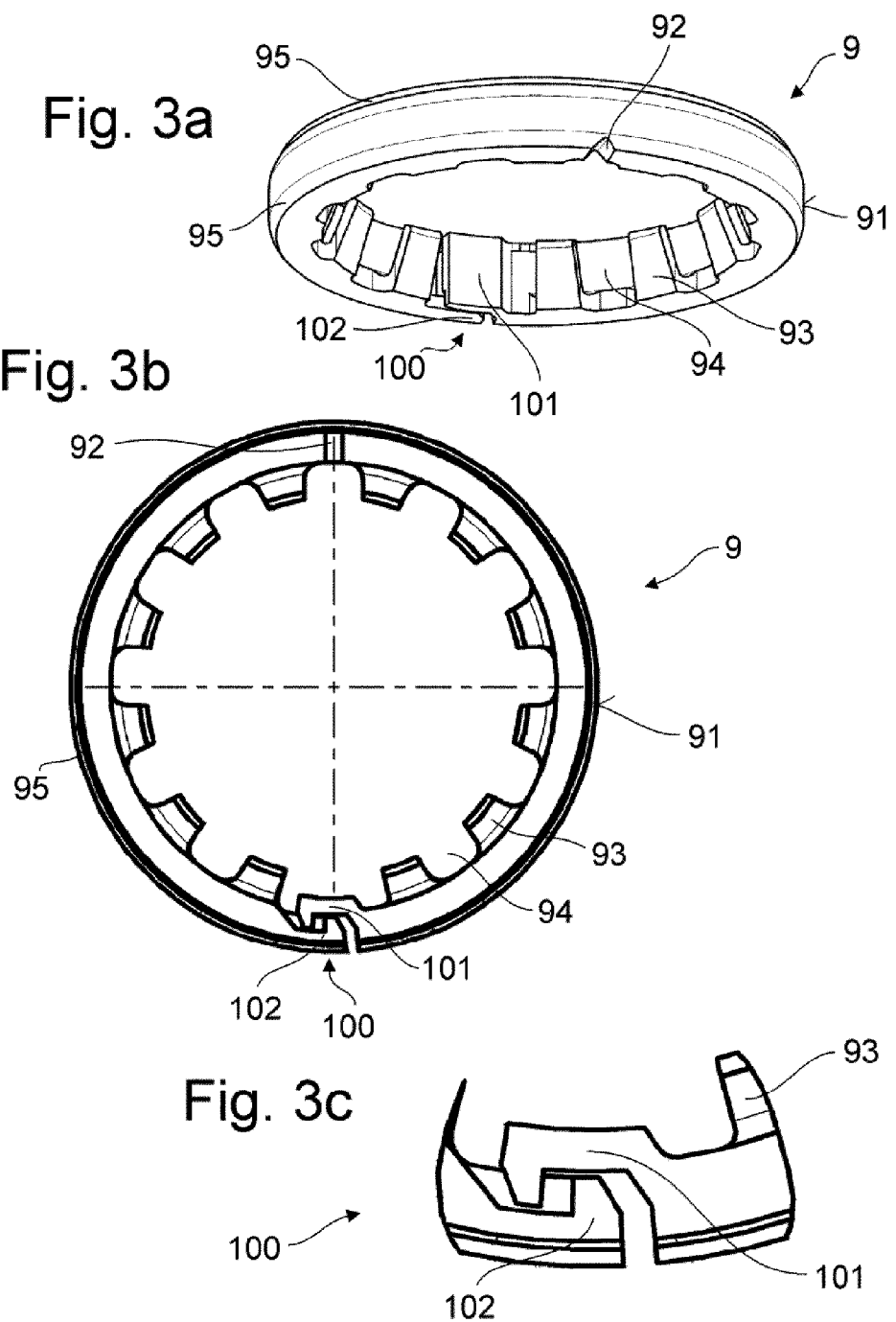

VIBRATION DAMPER WITH A HYDRAULIC END STOP

FIELD OF THE INVENTION

The present invention is directed to a vibration damper with a hydraulic end stop.

BACKGROUND OF THE INVENTION

Vibration dampers with hydraulic end stops have been used for many years in the automotive industry. For reasons relating to comfort, the damping force of a vibration damper cannot be increased to any desired level. Therefore, the damping force is not always sufficient to damp body movements under extreme roadway stimuli. As a result, the axle and vibration damper can move into the rebound limit at high speed. Resilient end stops of elastic material are usually used for absorbing impact energy. However, the energy absorption of these parts is severely limited depending on the material used. On the other hand, hydraulically acting end stops are capable of absorbing appreciably higher impact energy.

U.S. Pat. No. 4,345,748 describes a vibration damper with a mechanical-hydraulic end stop. The mechanical-hydraulic end stop disclosed therein provides a complicated combination of spring elements comprising multiple parts and multiple materials and an end stop ring.

The twin-tube vibration damper described in DE 81 30 523 U1 provides the advantage that it uses a helical spring which holds the hydraulic end stop in position and counteracts impact energy.

A vibration damper which uses an auxiliary piston supported at the working piston as hydraulic end stop is known from GB1,192,846. The piston moves into an auxiliary cylinder inserted in the cylinder when the piston rod moves out of the cylinder and displaces the damping medium which is located therein and which can escape through the channels which are incorporated in the auxiliary piston specifically for this purpose.

DE 42 12 228 C2 discloses a hydraulic vibration damper with an end stop which has a tubular part inserted into the cylinder and a stop piston. The stop piston has at least one thin stop disk which is supported by a supporting disk. During a rebound process, the stop disk moves into the tubular part and displaces the damping medium located therein. The stop disk forms the gap for the residual amount of damping medium between the inner wall of the tubular part and the stop piston and must have close tolerances.

U.S. Pat. No. 6,634,471 likewise discloses a highly complicated construction of a hydraulic end stop for a vibration damper which comprises at least five parts and has locking formations which engage in one another in the rebound phase and which accordingly enclose the damping medium in a chamber and release the damping medium subsequently in a defined manner.

It is thus an object of the invention to provide a vibration damper with a hydraulic end stop which is simple and inexpensive to produce and which is capable of decreasing a high impact energy.

SUMMARY OF THE INVENTION

The vibration damper according to the invention is characterized in that the hydraulic end stop has a sealing ring which is arranged between the end stop ring and the closure element, is supported axially on one side at the end stop ring, engages radially around the piston rod, is mounted in a sliding manner at the piston rod, and with its outer circumferential surface radially contacts the inner wall of the control space, wherein the sealing ring has at least one radial throttle groove which takes effect when the end stop with the sealing ring moves into the control space and ensures a defined flow of damping medium between the control chamber and the first working space, and wherein the sealing ring has a plurality of spring tongues which are supported at a supporting surface on the piston rod side.

According to an advantageous embodiment, the sealing ring has at least one cutout formed at the radially inner surface thereof, which cutout is dimensioned in a manner such that it extends axially over the entire height of the sealing ring. More material can be spared in this way. Further, a uniform distribution of the damping medium pressure acting radially on the sealing ring and, therefore, of the pressing pressure between the sealing ring and the inner wall of the control tube is achieved in this way. Accordingly, the flow of damping medium out of the control chamber can be additionally controlled.

When the cutout is connected to the throttle groove, a channel is formed which can be used additionally to control the flow of damping medium.

In a further advantageous embodiment, a supporting surface is constructed as an annular groove at the piston rod. When the axial extension of the annular groove is greater than the height of the spring tongues, the sealing ring can slide along the annular groove in direction of the closure element when leaving the end stroke region of the piston, can lift from the end stop ring and can release the flow of damping medium from the first working chamber into the control chamber.

When the sealing ring has at least one outer bevel which is formed, for example, at the side remote of the end stop ring in the installed condition, a tilting of the control ring can be prevented during penetration into the control tube. It is also advantageous for this purpose to form the outer bevel of the sealing ring at the side remote of the end stop ring in the installed condition. For the same purpose, the control tube can advantageously have an inner bevel at its end remote of the fastening portion.

To increase the flexibility of the sealing ring, the sealing ring can be formed with interruptions in its circumference. This better compensates for deviations in geometry and a possible radial offset. According to a further advantageous embodiment, the widening of the sealing ring in circumferential direction can be limited by an engagement formation with locking tongues formed thereon.

When the sealing ring is formed from a plastic having resilient characteristics in a further advantageous manner, impact noises during full rebound of the damper can be appreciably reduced.

In an advantageous manner, the control space inside the cylinder can be limited radially by a control tube. At one end of the cylinder, the control tube can be inserted and fixed therein. A fastening portion which is formed at the end of the control tube facing the closure element in the installed position and which has a greater diameter than the diameter of the rest of the control tube facilitates the fastening of the control tube in the cylinder space. Alternatively, locking notches can be formed in the fastening portion which enter into a locking formation with a further structural component part of the vibration damper.

According to a further advantageous embodiment, the control tube has at least one axial bypass groove. A defined damping force curve can be achieved in the rebound phase through the length and selected cross section of the groove. The same effect is achieved through the use of a plurality of bypass grooves with different lengths and different cross sections.

BRIEF DESCRIPTION OF THE DRAWINGS

Further details and advantages of the present invention are disclosed in the following description referring to the drawings in which:

FIG. 3a is a perspective view of a sealing ring according to the invention;

FIG. 3b is a top view of the sealing ring according to FIG. 3a;

FIG. 3c is an enlarged view of the closure; and

DETAILED DESCRIPTION OF THE PREFERRED EMBODIMENTS

Figure 1:
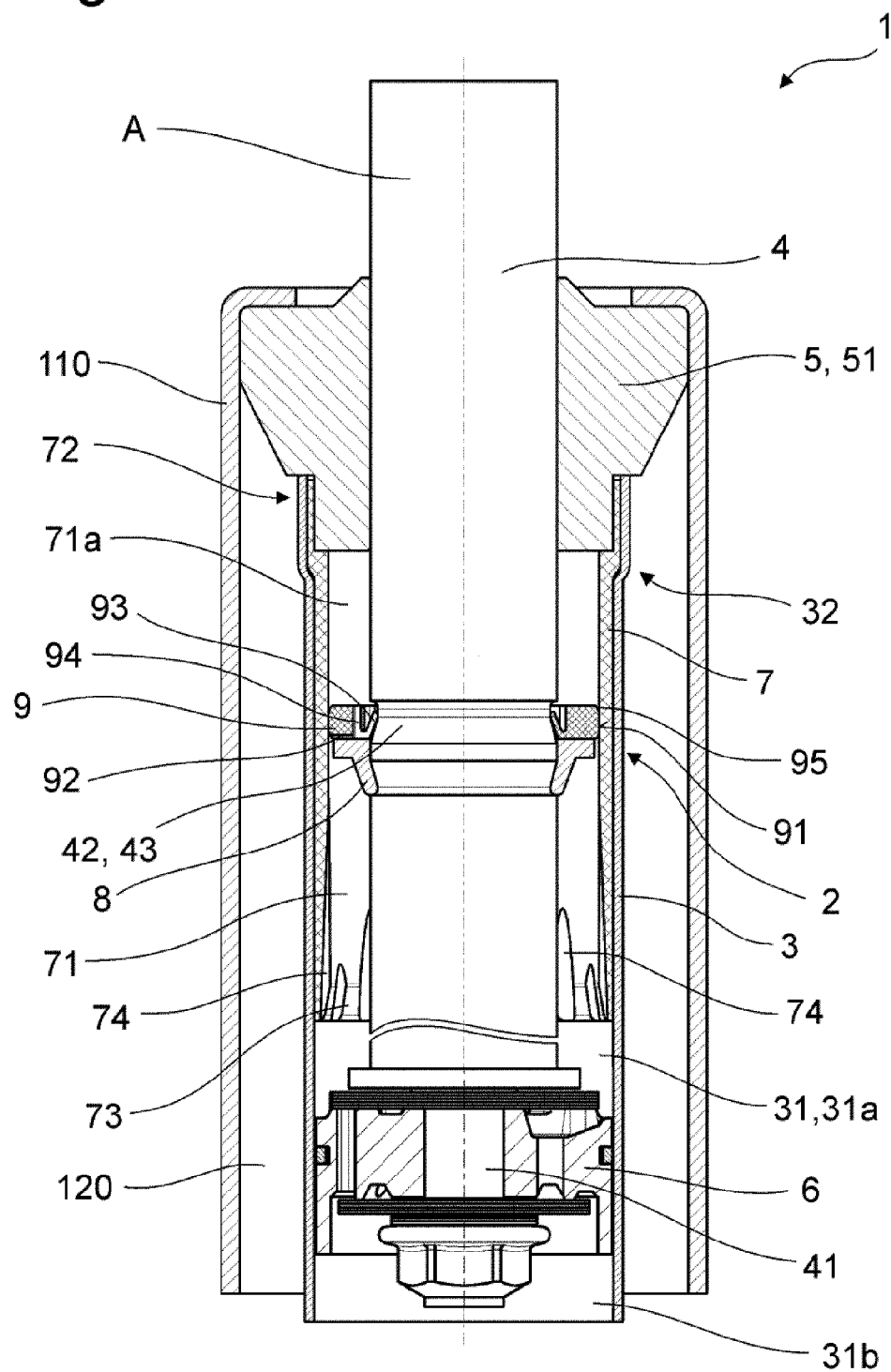
FIG. 1 is a longitudinal sectional view through the vibration damper according to the invention with hydraulic end stop.
Figure 2A:
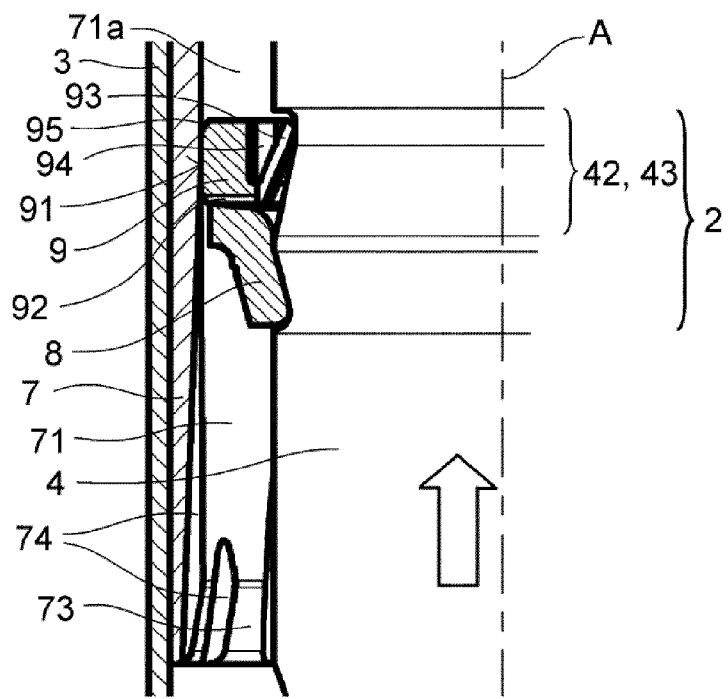
FIG. 2a is a longitudinal sectional view through a vibration damper according to FIG. 1 showing the flow of damping medium in the extension phase.
Figure 2B:
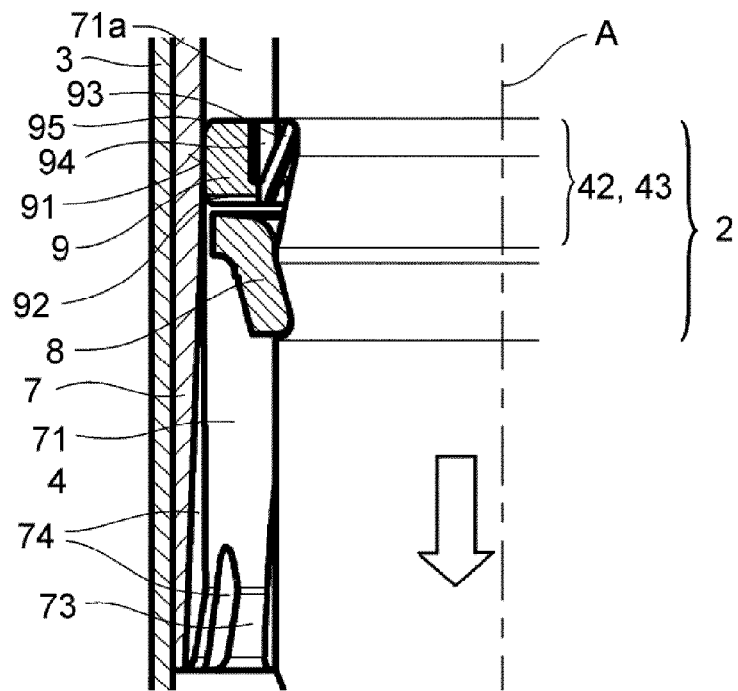
FIG. 2b is a longitudinal sectional view through a vibration damper according to FIG. 1 showing the flow of damping medium in the compression phase.
Figure 4:
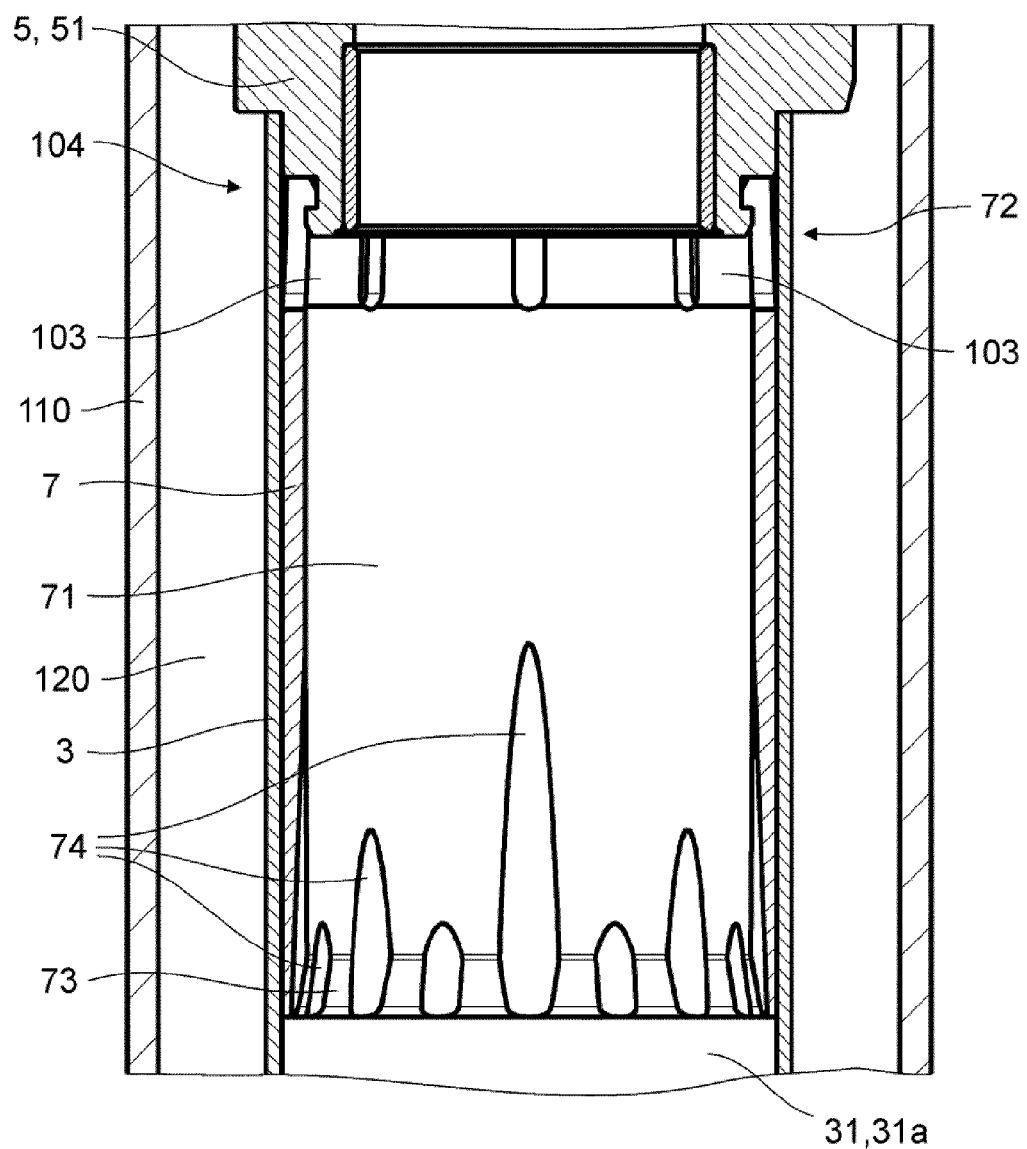
FIG. 4 is a longitudinal sectional view through an alternative embodiment of the vibration damper according to the invention with hydraulic end stop.

FIGS. 1 and 4 show a constructional embodiment of the vibration damper 1 with a hydraulic end stop 2 according to the invention, wherein the latter is constructed as an extension stop. An embodiment as compression stop is not shown separately in the drawings but is, of course, also possible.

The vibration damper 1 shown in FIG. 1 is a twin-tube damper and comprises a cylinder 3 which is enclosed by an outer tube 110. The cylinder space 31 is completely filled with a liquid damping medium. A compensation space 120 which is filled with a definite amount of damping medium is radially defined between the outer tube 110 and the cylinder 3. The remaining volume of the compensation space 120 is filled with gas. The cylinder space 31 and the compensation space 120 are connected by a bottom valve, not shown, which defines the flow of damping medium between the two spaces. However, application of the present invention cannot be limited only to a twin-tube damper. On the contrary, it can also be used in a mono-tube damper.

As is shown in FIGS. 1 and 4, the cylinder 3 is axially limited or closed at one side by a closure element 5. In view of the fact that the constructional embodiments depict an extension stop, the piston rod guide 51 takes over the role of closure element 5.

A piston rod 4 is axially guided inside the cylinder space 31. The piston rod 4 penetrates a piston rod guide 51 closing one cylinder end 32. The piston rod guide 51 is shown schematically in FIGS. 1 and 4. The piston rod seals to be used are omitted from the drawings for the sake of simplicity. The piston rod 4 is connected at one piston rod end 41 to a piston 6. The piston 6 divides the cylinder space 31 into a first working space 31a arranged between the piston 6 and the piston rod guide 51 and a second working space 31b arranged on the opposite side of the piston 6.

Further, the constructional embodiment of a vibration damper 1 according to the invention which is shown in FIG. 1 has a control space 71 with a somewhat smaller effective diameter than the cylinder 3. This can be achieved by a reduction in diameter or constriction of the cylinder tube. Alternatively, a control tube can be inserted into the cylinder 3. This constructional embodiment is shown in FIGS. 1, 2a, 2b and 4, which show a control tube 7 inserted into and fastened in the cylinder 3 at the end of the cylinder 3 on the piston rod guide side. The control tube 7 radially limits a control space 71 and encloses the piston rod 4 located therein. In the depicted embodiment, the control tube 7 is dimensioned such that it contacts the radially inner surface of the cylinder 3 by its entire radially outer surface. The diameter of the control space 71 inside the control tube 7 is accordingly only negligibly smaller than the diameter of the cylinder space 31. The difference in diameter between the two spaces is determined solely by the wall thickness of the control tube 71. The resulting maximum possible size of the control space 71 allows the use of a hydraulic end stop 2 which has a relatively large pressure-impinged end face. Accordingly, extreme loads can be dampened more easily and material wear can be more easily avoided. In the depicted constructional embodiment of the control tube 7 according to the invention, a plurality of bypass grooves 74 are formed. A defined uniform force curve is achieved in the end stroke region by the different axial extension of the bypass grooves 74 and by their different cross sections.

The end stroke region corresponds to the end phase of an extension phase in an extension impact or the end phase of a compression phase during a compression impact.

The hydraulic end stop 2 is formed of two parts and comprises an end stop ring 8 and a sealing ring 9. In the extension phase, the end stop 2 enters into the control tube 7 and axially limits the control space 71 at the side of the control tube 7 opposite the piston rod guide 51 such that a control chamber 71a is formed inside the control tube 7, which control chamber 71a is axially limited by the piston rod guide 51 on the one hand and by the end stop 2 on the other hand. The volume of the control chamber 71a can be altered depending on the axial position of the end stop 2 in the control tube 7.

The end stop ring 8 engages around the piston rod 4 radially and is fastened to the piston rod 4 between the piston 6 and the piston rod guide 51. The end stop ring 8 axially supports the sealing ring 9 and conveys impact forces into the piston rod 4. For this purpose, the end stop ring 8 is connected to the piston rod 4 by frictional engagement. In FIG. 1, the end stop ring 8 is pressed into a circumferential groove formed at the piston rod 4. However, this fastening method is not the only one that can be considered. Generally, the end stop ring 8 can be secured to the piston rod 4 by welding, soldering, press fitting, riveting, screwing or by other fastening methods familiar to persons skill in the art.

The sealing ring 9 is arranged between the end stop ring 8 and the piston rod guide 51. Further, the sealing ring 9 engages radially around the piston rod 4 and is slidingly mounted at the piston rod 4. When the piston rod 4 extends completely out of the cylinder 3, the sealing ring 9 serves as a conventional end stop and contacts a damper closure element which is shown in FIGS. 1 and 2 as piston rod guide 51. To reduce the impact noises occurring thereby, the sealing ring 9 is usually constructed of a plastic having resilient characteristics or of rubber.

The sealing ring 9 contacts the end stop ring 8 in the extension phase. When penetrating into the control tube 7, the sealing ring 9 presses against the inner wall of the control tube 7 by its outer circumferential surface and accordingly at least partially seals the control chamber 71a. In this way deviations in the geometry of the control tube 7 based on tolerances and possible deviations in concentricity between the piston rod 4 and control tube 7 are compensated. To amplify this effect and to increase the flexibility of the sealing ring 9, the sealing ring 9 is formed with a discontinuous circumference and is mounted at the piston rod 4 in a radially floating manner. This compensates for deviations in geometry and a possible radial offset. The widening of the sealing ring 9 in circumferential direction is limited by a closure 100 formed at the sealing ring 9 with two locking tongues 101; 102 engaging one inside the other. The closure 100 formed at the sealing ring 9 can be seen particularly clearly in FIGS. 3a-c.

The sealing ring 9 has a radial throttle groove 92 which is formed at the side facing the end stop ring 8 and which allows a defined flow of damping medium between the control chamber 71a and the rest of the control space 71 particularly in the extension phase.

Further, the sealing ring 9 has a plurality of spring tongues 93 which are formed integral with the sealing ring 9 at the inner circumferential surface thereof and which are supported at the piston rod 4. The spring tongues 93 cause the sealing ring 9 to press against the control tube 7 in a defined manner. The spring tongues 93 are also conceivably formed as a separate element or as a plurality of elements instead of being formed integral with the sealing ring 9. In this case, the same material or a combination of different materials can be used to produce the spring tongues 93 and the sealing ring 9.

The depicted embodiment shows a plurality of cutouts 94 which are distributed at the radially inner surface of the sealing ring 9 between the spring tongues 93 and which extend along the entire height of the sealing ring 9. The cutout 94 which is connected to the throttle groove 92 should be mentioned in particular. This forms a throttle channel connecting the control chamber 71a to the rest of the control space 71. With increasing damping medium pressure inside the control chamber 71a in the extension phase, a defined uniform increase in pressing pressure between the sealing ring 9 and the control tube 7 is achieved by uniformly distributing the cutouts 94 within the sealing ring 9.

The sealing ring 9 with the spring tongues 93 and cutouts 94 formed thereon is shown more fully in FIGS. 3a and 3b.

An inner bevel 73 formed at the control tube 7 is clearly shown in FIGS. 1; 2a; 2b and 4. The outer bevels 95 of the sealing ring 9 are shown in all of the drawings. In the depicted constructional embodiments, the outer bevels 95 are formed on both front sides of the sealing ring 9. To further lower production costs, either the two outer bevels 95 or at least the outer bevel 95 at the front side of the sealing ring 9 facing the end stop ring or the inner bevel 73 of the control tube 7 can be omitted.

As can be seen in FIGS. 1; 2a; 2b and 4, the piston rod 4 has an annular groove 42 which serves to support the spring tongues 93. Since the axial extension of the annular groove 42 formed at the piston rod 4 with respect to the longitudinal axis A of the piston rod 4 is greater than the height of the spring tongues 93, the sealing ring 9 can slide along the annular groove 42 in direction of the piston rod guide 51 in the compression phase, can lift from the end stop ring 8 and can release the flow of damping medium from the first working chamber 31a into the control chamber 71a.

FIGS. 1 and 4 show that the control tube 7 has a fastening portion 72 at its end facing the piston rod guide 51 in the installed position. FIG. 1 shows a constructional variant with a fastening portion 72 which has a greater diameter than the diameter of the rest of the control tube 7. In this constructional embodiment, the cylinder end facing the piston rod guide 51 likewise has an enlarged diameter. The control tube 7 is inserted into the cylinder 3 and is supported by the fastening portion 72 axially inside of the cylinder 3 in the region of the smaller cylinder diameter. Finally, the control tube 7 is clamped in the cylinder 3 with a piston rod guide 51.

FIG. 4 shows a simplified version of the control tube 7 and cylinder 3. In this constructional embodiment, the cylinder 3 has a continuously uniform diameter. The control tube 7 has in its fastening portion 72 a plurality of locking notches 103 which enter into a locking formation 104 with the piston rod guide 51. Naturally, a different damper component which can be associated with the damper closure or a damper closure element can be used for this purpose instead of a piston rod guide 51. The damper closure element is shown in FIG. 4 as a piston rod guide 51 which has a complementary contour for the locking notches 103 of the control tube 7 in its end portion facing the piston 3. The complementary contour can be formed as a circumferential groove or as a continuous groove or a plurality of recesses. The latter two embodiments would not only secure the control tube 7 axially, but would also secure the control tube 7 against rotation.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

REFERENCE NUMERALS 1 vibration damper
2 end stop
3 cylinder
31 cylinder space
31a first working space
31b second working space
32 cylinder end
4 piston rod
41 end of the piston rod
42 supporting surface
43 annular groove
5 closure element
51 piston rod guide
6 piston
7 control tube
71 control space
71a control chamber
72 fastening portion
73 inner bevel
74 bypass groove
8 end stop ring
9 sealing ring
91 circumferential surface 92 throttle groove
93 spring tongue
94 cutout
95 outer bevel
100 engagement formation
101 locking tongue
102 locking tongue
103 locking notch
104 locking formation
110 outer tube
120 compensation space
A longitudinal axis of the piston rod

The invention claimed is:

1. A vibration damper (1) with a hydraulic end stop (2) comprising:
    a cylinder (3) radially limiting a cylinder space (31) filled with damping medium;
    a piston rod guide (51) axially limiting the cylinder space (31) on at least one side;
    a piston rod (4) having a supporting surface (42) and axially guided within the cylinder space (31) and penetrating the piston rod guide (51), the piston rod (4) connected to a piston (6) which divides the cylinder space (31) into a first working space (31a) arranged between the piston (6) and the piston rod guide (51) and a second working space (31b) arranged on the opposite side of the piston (6);
    a control space (71) formed at one end of the cylinder (3), the control space being bounded by an inner wall;
    wherein the hydraulic end stop (2) comprises an end stop ring (8), axially secured to the piston rod (4) and engaging radially around the piston rod (4), and wherein the hydraulic end stop (2) penetrates into the control space (71) in the end stroke region of the piston and axially limits the control space (71) on one side such that a control chamber (71a) is formed inside the control space (71), the control chamber (71a) having a volume and being axially limited by the closure element (5) on the one side and by the hydraulic end stop (2) on the other side; the volume of the control chamber (71a) being alterable depending on the axial position of the hydraulic end stop (2) in the control space (71);
    the hydraulic end stop (2) further comprising a sealing ring (9) that is arranged between the end stop ring (8) and the piston rod guide (51), that is supported axially on one side at the end stop ring (8), that engages radially around the piston rod (4), that is mounted in a sliding manner at the piston rod (4), wherein the sealing ring has an outer circumferential surface (91) radially contacting the inner wall of the control space (71);
    wherein the sealing ring (9) comprises at least one radial throttle groove (92) which ensures a defined flow of damping medium between the control chamber (71a) and the first working space (31a) when the hydraulic end stop (2) with the sealing ring (9) moves into the control space (71); and
    wherein the sealing ring (9) comprises a plurality of spring tongues (93) which are supported at the supporting surface (42) of the piston rod.

2. The vibration damper (1) with a hydraulic end stop (2) according to claim 1, wherein the sealing ring (9) has at least one cutout (94) formed at the radially inner surface thereof, and wherein the cutout (94) is dimensioned so as to extend axially over the entire height of the sealing ring (9).

3. The vibration damper (1) with a hydraulic end stop (2) according claim 1, wherein the sealing ring (9) comprises a throttle groove (92) and wherein the cutout (94) is connected to the throttle groove (92).

4. The vibration damper (1) with a hydraulic end stop (2) according to claim 1, wherein the supporting surface (42) is constructed as an annular groove (43).

5. The vibration damper (1) with a hydraulic end stop (2) according to claim 4, wherein the spring tongues (93) have a height and the annular groove (43) has an axial extension, and wherein the axial extension of the annular groove (43) is greater than the height of the spring tongues (93).

6. The vibration damper (1) with a hydraulic end stop (2) according to claim 1, wherein the sealing ring (9) has at least one outer bevel (95).

7. The vibration damper (1) with a hydraulic end stop (2) according to claim 6, wherein the outer bevel (95) of the sealing ring (9) is formed at the side remote of the end stop ring (8) in the installed condition.

8. The vibration damper (1) with a hydraulic end stop (2) according to claim 1, wherein the sealing ring (9) comprises an engagement formation (100) with locking tongues (101; 102) formed thereon.

9. The vibration damper (1) with a hydraulic end stop (2) according to claim 1, wherein the sealing ring (9) is formed from a plastic having resilient characteristics.

10. The vibration damper (1) with a hydraulic end stop (2) according to claim 1, additionally comprising a control tube (7), and wherein the control space (71) is limited radially by the control tube (7).

11. The vibration damper (1) with a hydraulic end stop (2) according to claim 10, wherein the control tube (7) comprises a fastening portion (72) at the end of the control tube (7) facing the piston rod guide (5) in the installed position.

12. The vibration damper (1) with a hydraulic end stop (2) according to claim 11, wherein the fastening portion (72) has a greater diameter than the diameter of the rest of the control tube (7).

13. The vibration damper (1) with a hydraulic end stop (2) according claim 11, wherein the fastening portion (72) comprises locking notches (103).

14. The vibration damper (1) with a hydraulic end stop (2) according to claim 13, wherein the control tube (7) further comprises a fastening portion (72) and locking notches (103) constructed to enter into a locking formation (104) with a further structural component part of the vibration damper (1) in the fastening portion (72) of the control tube (7).

15. The vibration damper (1) with a hydraulic end stop (2) according claim 10, wherein the control tube (7) has an inner bevel (73) at its end remote of the fastening portion (72).

16. The vibration damper (1) with a hydraulic end stop (2) according to claim 10, wherein the control tube (7) comprises at least one axial bypass groove (74).

* * * * *